No. 695,459. Patented Mar. 18, 1902.
H. A. ICKE.
MEASURING WEIR.
(Application filed Sept. 1, 1900.)
(No Model.) 2 Sheets—Sheet 1.

No. 695,459. Patented Mar. 18, 1902.
H. A. ICKE.
MEASURING WEIR.
(Application filed Sept. 1, 1900.)
(No Model.) 2 Sheets—Sheet 2.
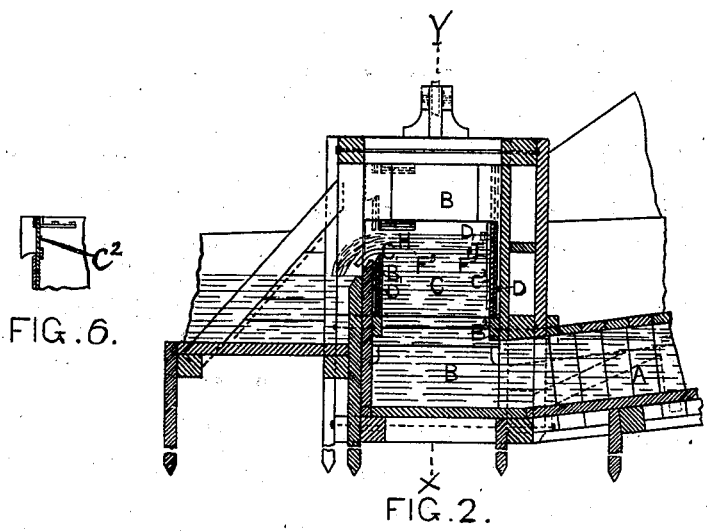
FIG. 6.
FIG. 2.
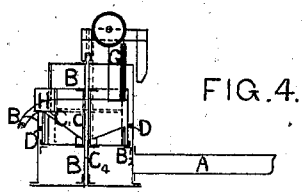
FIG. 4.
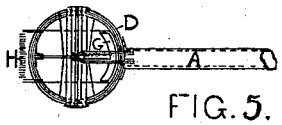
FIG. 5.
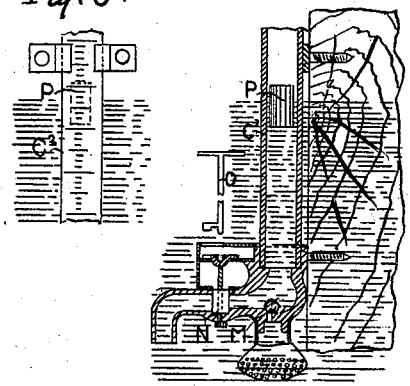
Fig. 8.
FIG. 7.
WITNESSES:
INVENTOR
ATTORNEYS
THE NORRIS PETERS CO., PHOTO-LITHO., WASHINGTON, D. C.

UNITED STATES PATENT OFFICE.

HENRY ARTHUR ICKE, OF PIETERMARITZBURG, NATAL.

MEASURING-WEIR.

SPECIFICATION forming part of Letters Patent No. 695,459, dated March 18, 1902.

Application filed September 1, 1900. Serial No. 28,762. (No model.)

*To all whom it may concern:*

Be it known that I, HENRY ARTHUR ICKE, a subject of the Queen of Great Britain and Ireland, residing at Pietermaritzburg, Natal, have invented a new and useful Improvement in Measuring-Weirs and the Like, of which the following is a specification.

In order that water flowing in open channels may be sold by quantity, it is necessary that the volume of water admitted to the channel can be readily ascertained at any time and that the module or measuring apparatus be of such construction and so regulated as to leave definite indications of any attempt to tamper with it so as to affect the quantity of water discharged. No method has as yet, to the inventor's knowledge, been devised for easily and cheaply accomplishing this.

The object of my invention is to provide an apparatus for use on irrigation works for cheaply and accurately measuring the quantity of water admitted to distributory canals or laterals, an apparatus that can be set to discharge any fraction of its capacity, will not be affected by the variation of the water-level in the supplying-canal, and on which any attempt to increase the discharge for which it is for the time set will leave traces easily recognizable.

My invention consists, essentially, of a movable tube fitted with air-chambers, water-ballast chambers, and compensating weights, as hereinafter more fully described, and adapted to discharge water over a portion of the circumference of its upper end and at the same time with any variation of level of the water in which it floats to move vertically against a resilient roller-packing in a fixed tube.

Figure 1:
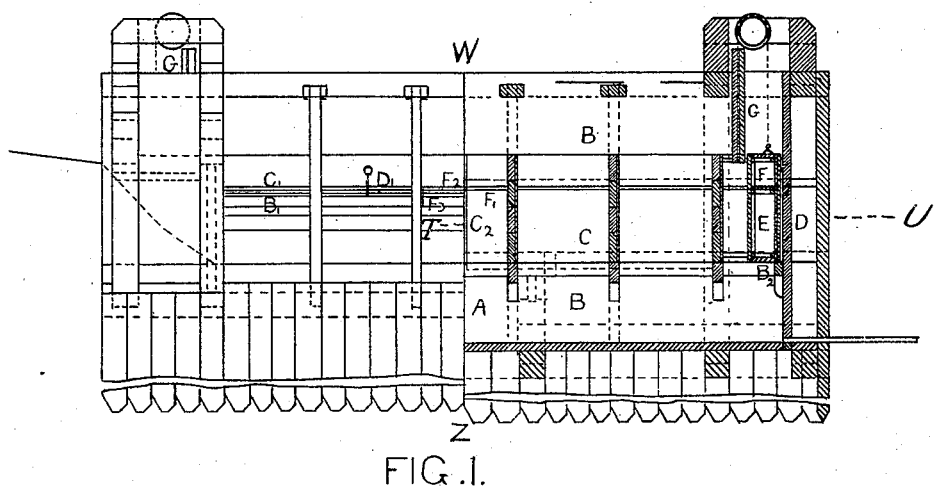
Figure 3:
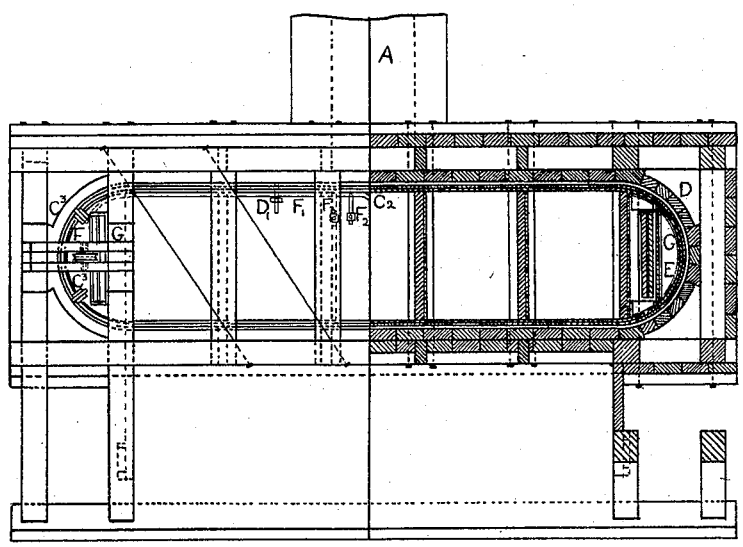

In the accompanying drawings, which illustrate my invention, Figures 1, 2, and 3 show my measuring-weir with oblong tubes having straight sides and semicircular ends, constructed in wood, Fig. 1 being a half front elevation and half longitudinal vertical section on the line $x\,y$ of Fig. 2; Fig. 2, a transverse vertical section taken centrally of Fig. 1 on line $w\,z$ of Fig. 1; and Fig. 3, a half plan at top and half horizontal section on the line T U of Fig. 1, the weight C being shown in section also. Fig. 4 is a side view of my measuring apparatus. Fig. 5 is a plan view of Fig. 4, these views Figs. 4 and 5 being intended only to show the general form of the apparatus. Fig. 6 is a sectional view of the left-hand upper corner of the movable tube D as shown in Fig. 2, illustrating the position of the shutter $C^2$ when any particular bay is closed thereby. Fig. 7 represents in vertical section an indicator to show the head or overfall under which the water is being discharged. Fig. 8 is a front view of a part of the graduated tube of Fig. 7.

In these figures, A indicates the culvert leading from the supplying-canal; B, the fixed tube; C, the movable tube; D, the roller-packing; E, the air-chambers; F, the water-ballast chambers; G, the compensating weights; H, the overfall of water. A portion of the circumference of the upper ends of the movable tube is at a lower level than the remainder and forms a weir-crest for the overflow of water, a corresponding portion of the side of the fixed tube being open to allow of the free passage of the water. The movable tube, as shown in all the figures, is at its minimum height, the part of the circumference $c'$ of its upper end, which forms the weir-crest, being just above the opening $B'$ in the fixed tube. The movable tube is prevented from descending to a lower level than this by checks $B^2$, attached to the fixed tube, and its upward motion is limited by the horizontal members of the framing of the fixed tube. These checks form the limits of the stroke of the movable tube, which may be of any length permissible by the loss of head occasioned thereby. The weight of the movable tube with the water-ballast chambers empty is such as to cause it to float in water with the weir-crest at the minimum practicable depth—say three inches—of overfall below the surface of the water-level at the back of the tube. Water under a sufficient head being admitted to the fixed and movable tubes causes the movable tube to rise, and any depth of overflow within its discharging capacity can then be given to the weir by admitting water to the water-ballast chambers. The water-ballast chambers have a connecting-pipe $F'$ and inlet and outlet pipes $F^2$ and $F^3$, fitted with stop-valves for the regulation of the quantity of water within the chambers, and thereby the regulation of the discharge of the weir. The movable tube rises with the water within it. The water in the movable tube rises to the level of the water in the supplying-canal, minus the heads due to entry to the supply-culvert and the velocity and friction in the culvert and tubes. A varying water-level in the supplying-canal causes a corresponding variation in the height of the movable tube and of the water within it, but does not affect the depth of the overfall of the weir, which depends altogether on the difference of level of the weir-crest and of the water at the back of the tube. The length of the stroke of the movable tube is the measure of the variation of the water-level which may take place in the supplying-canal without affecting the discharge of the weir.

The head due to the velocity of the water entering the apparatus and the difference of the water-level in the supplying-canal and the movable tube may be varied at will by the use of a water-gate at the entrance to the supply-culvert to vary the size of the opening. The movable tube and the water within it may therefore be set to any height within the stroke of the tube independently of the water-level in the supplying-canal. In setting the height of the movable tube for any given period it should be placed at a high or low level, according as the water-level in the supplying-canal is expected to fall or rise during that period.

The resilient roller-packing D may be made of india-rubber and have a small hole running through its center, or it may be made of hemp or other textile material, resilience being given to it by internal rings or a continuous coil of steel wire. The packing acts as a bar to the passage of water and prevents friction between the tubes. Its motion is always equal to half the motion of the movable tube. It should be compressed between the tubes sufficiently to prevent sliding. As the rate of motion of the roller-packing is always equal to half that of the weir-crest, it follows that the pressure of water on the under side of the packing is increased by an upward motion of the tube by a head of water equal to half the distance moved by the tube, and considering the space above the roller-packing to be filled with water the pressure on the upper side of the packing is decreased by a like amount. It therefore follows that any motion of the tube causes a difference in the pressure on the roller-packing by a head of water equal to the distance moved by the tube. This difference of pressure on the roller-packing (which is the same in effect as though it were on the movable tube) is compensated for by the employment of a weight or weights G. They may conveniently be made of a plate of iron sandwiched between two pieces of wood and must be of a specific gravity greater than that of water and a horizontal sectional area exactly equal to half the area of the horizontal section of the space between the movable and fixed tubes, thus having a volume per unit of depth equal to half the cubic contents of the space between the two tubes per the same unit of depth. Each of these weights is attached to the movable tube by a rope or chain passing over a pulley J, and when in air exert a lifting force on the tube equal to their weight. As the tube and the water within it ascend they practically sink into the water at a rate equal to double the rate of motion of the movable tube and lose a portion of their weight equal to a volume of water of the same cubic contents as their own volume, which exactly compensates for difference of pressure on the roller-packing. Where the movable tube is made of iron or other heavy material, the compensating weights may also be made of iron, so as to act also as balance-weights.

To insure the space between the tubes above the roller-packing filling with water as the tube descends, and thus giving a definite quantity to be compensated for, a hole should be made through the back of the tube at a level with the weir-crest, and a bent pipe D', with a swivel-joint and a float attached to keep its inner mouth at the same distance below the surface of the water, inserted to give a sufficient and in this manner a constant flow of water into the space between the tubes above the roller-packing. This flow of water, which is comparatively very small, may be added to the quantity discharged over the weir-crest.

The fixed and movable tubes may be of any figure compatible with the use of a continuous resilient roller-packing. Figs. 4 and 5 give the outline of my measuring apparatus with circular tubes and made in iron. In all cases walls should extend across the movable tube at the ends of the weir-crest and at right angles, or as near as may be, to it and rise above the weir-crest to a height greater than that of the intended overfall. Long tubes should also be stiffened with diaphragms of similar figure to the end walls. The diaphragms divide the weir into separate bags, any number of which may be closed by shutters $C^2$, as shown in Fig. 6, thus giving a practicable depth of overfall to the remainder for small discharges. The shutters $C^2$ when not in use are stored above the overfall, so as not to affect the weight or balance of the tube. The end walls and diaphragms give a straight flow to the water within the tube, and thus suppress end contraction. Above the weir-crest they extend for some distance beyond it and coincide with uprights in the wall of the fixed tube and form guides for the overfall of the water. The movable tube should be evenly balanced and guided in its motion by friction-wheels $C^3$ or shafts $C^4$, as shown.

The depth of overfall of the weir or head under which the water is being discharged may be indicated by the device shown in Fig. 7, which consists of a graduated transparent tube $C^2$, into which the water rises through a valve M and is discharged only through a cock N. The cock N is opened by special key. Any attempts, therefore, to increase the discharge of the apparatus will be shown by the height of the water in the tube above that for which it was set. This registering-tube should extend for some distance below the weir-crest and should have a small hole through its upper end for the passage of air. The zero of its scale should be at the level of the weir-crest, plus the head required to open the valve, and it may be graduated to show either the weight of discharge per unit of length of weir-crest or the depth of overfall. In order the more easily and accurately to read the height of the water indicated by the transparent tube, a black sharp-edged disk or cylinder P may be floated within it, in which case the zero of the graduated scale must be at a height above the weir-crest equal to the height of the upper edge of the disk or cylinder above the water in which it floats, plus the head required to open the valve of the tube. When the transparent tube is graduated to give the quantity of water discharged per unit of length of the weir, the small quantity of water to fill the space between the movable and fixed tubes may be allowed to pass through the hole simply at the back of the movable tube and the bent pipe D' omitted, the small quantity discharged in this way being included in the graduations of the scale on the transparent tube.

My measuring apparatus may be used as a regulator for canal-heads, in which case it may be constructed with or without compensating weights, and where placed on the upstream side of dams or in deep forebays at the side of main canals the lower portion of the fixed tube may be omitted. It may be made of any suitable material and to any dimensions practicable.

The water-gage is fixed on the inside of the movable pipe D.

I do not wish to limit myself to the movable joint as composed of the roller-packing, as other forms of flexible vertically-movable packing may be used which will have exactly the same action as regards the effect of the head of water acting on the movable pipe, the packing only moving half the distance moved by the movable pipe.

Having now described my invention, what I claim, and desire to secure by Letters Patent, is—

1. A measuring-weir consisting of a fixed vertical pipe directly connected at its lower end with the supply-water, a vertical movable pipe within the fixed pipe having a weir-crest, means for making a working joint between the said two pipes, floats and adjustable ballast device arranged in connection with the said movable pipe, a portion of the upper edge of the fixed pipe being arranged at a lower level to form an outlet for the water and an adjacent portion of the movable pipe being also lower to form a weir-crest so that the water is retained in the fixed pipe at the level of or at a given level below the supply in order to float the weir-crest of the movable pipe at a definite distance below the surface of the supply-water and of the surface of water within itself.

2. A measuring-weir consisting of a fixed vertical pipe directly connected at its lower end with the supply-water a vertical movable pipe within the fixed pipe having a weir-crest, continuous flexible roller-packing for making a working joint between the said two pipes, floats and adjustable ballast device arranged upon the said movable pipe, means upon the fixed pipe for retaining within it the water at the level of supply, and compensating weights attached to the movable pipe and adapted to enter the water so as to compensate the difference of pressure on the roller-packing at varying heights of the one tube in the other.

3. In combination with a measuring-weir having a fixed pipe and movable pipe with a weir-crest, floats and adjustable ballast device arranged in connection with the movable pipe, a graduated transparent observation-tube, a float within the same, an inlet to the tube from the weir controlled by a non-return valve and adjustable outlet, substantially as described.

In witness whereof I have hereunto set my hand in presence of two witnesses.

HENRY ARTHUR ICKE.

Witnesses:
MARCUS FREDK. MORGAN,
ALFRED LISTER.